United States Patent [19]

François et al.

[11] 4,356,135

[45] Oct. 26, 1982

[54] PROCESS FOR THE PRODUCTION OF A CERAMIC MEMBER HAVING INCLUSIONS OF ELECTRICALLY CONDUCTIVE MATERIAL FLUSH WITH ITS SURFACE

[75] Inventors: Bernard François, Montbonnot; Jean-Claude Viguie, Eybens, both of France

[73] Assignee: Commissariat a l'Energie Atomique, Paris, France

[21] Appl. No.: 187,141

[22] Filed: Sep. 15, 1980

Related U.S. Application Data

[63] Continuation of Ser. No. 24,269, Mar. 27, 1979, abandoned.

[30] Foreign Application Priority Data

Mar. 30, 1978 [FR] France ............................ 78 09253

[51] Int. Cl.³ .................... C04B 37/00; C04B 39/00
[52] U.S. Cl. ...................................... 264/61; 264/60; 264/332; 428/472
[58] Field of Search ................. 428/469, 472; 264/60, 264/61, 62, 332, 111, 113, 122; 75/200, 206

[56] References Cited

U.S. PATENT DOCUMENTS

| 407,145 | 7/1889 | Anderson | 264/60 |
|---|---|---|---|
| 2,221,983 | 11/1940 | Mayer et al. | 264/111 |
| 2,267,954 | 12/1941 | Schumacher | 264/111 |
| 2,460,334 | 2/1949 | Buerger et al. | 264/61 |
| 3,985,513 | 10/1976 | Silaev et al. | 75/206 |
| 4,215,180 | 7/1980 | Misumi et al. | 428/472 |

FOREIGN PATENT DOCUMENTS 1513898  2/1968  France .

*Primary Examiner*—Donald E. Czaja
*Assistant Examiner*—W. Thompson
*Attorney, Agent, or Firm*—Kerkam, Stowell, Kondracki & Clarke

[57] ABSTRACT

Process for the production of a ceramic member having inclusions of electrically conductive material flush with its surface, wherein it comprises depositing on the bottom of a mould a small number of particles of said conductive material, placing above said particles the ceramic powder and compressing together the aggregate formed by the powder and the particles, followed by fritting at a temperature below the melting temperature of the conductive material.

Cathode—solid electrolyte assembly obtained by using the above process.

15 Claims, 1 Drawing Figure

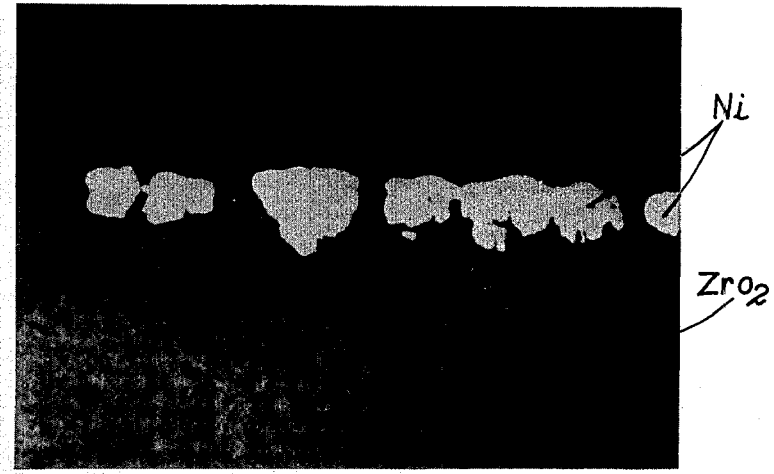

PROCESS FOR THE PRODUCTION OF A CERAMIC MEMBER HAVING INCLUSIONS OF ELECTRICALLY CONDUCTIVE MATERIAL FLUSH WITH ITS SURFACE

This application is a continuation of application Ser. No. 24,269, filed Mar. 27, 1979, now abandoned.

BACKGROUND OF THE INVENTION

The present invention relates to a process for the preparation of a ceramic member having on its surface inclusions of electrically conductive material, said member being usable more particularly for forming the cathode and the solid electrolyte of an electrolytic cell for high temperature steam for use in the production of gaseous hydrogen.

In view of the heavy demands of the chemical industry for hydrogen, recently procedures have been developed for the production of hydrogen by electrolysis of high temperature steam in cells having a solid electrolyte generally constituted by an oxygen ion-conducting ceramic material located between two electrodes respectively serving as the anode and the cathode.

In the case of such cells, the steam is introduced into the cathodic part of the cell at temperatures of about 760° to 950° C. and is reduced into gaseous hydrogen at the surface of the solid electrolyte when a voltage of about 1 V is applied to the terminals of the cell.

In a cell of this type, the gaseous hydrogen production is more particularly dependent on the structure of the cathode which must be porous and in addition it increases with the number of triple points, i.e. the number of contact points between the solid electrode, the cathode and the steam circulating in the cathode compartment.

In order to obtain this high triple point density, cathode-solid electrolyte assemblies are at present used and which are formed by a solid electrolyte layer to which is applied a porous cermet layer, whose metal particles constitute the cathode of the cell.

However, such assemblies have the disadvantage of not having satisfactory mechanical resistance properties, because, under the cell operating conditions, they are subject to mechanical stresses due more particularly to the expansion difference between the two layers.

Processes for the production of ceramic members having inclusions of an electrically conductive material made in a single operation are also known. In such cases, stresses do not occur between the solid electrolyte and the conductive material.

An example of such a known process is described in French Pat. No. 1,513,898 entitled "Metal anodes for high temperature galvanic fuel cells with a solid electrolyte and process for the production thereof", filed in the name of S. A. Brown Boveri et Cie.

As can be gathered more particularly from reading the examples given in this patent, a layer formed from a mixture of conductive material, solid electrolyte and a porogenic material is distributed over the solid electrolyte. The proportion by volume of the porogenic material used, in this case ammonium carbonate, in the formation of said mixture is not below 50% in any of the examples given.

There are several disadvantages as a result of using this porogenic material. On the one hand, it is prejudicial to the circulation of gases. This supplementary barrier leads to a diffusion coefficient limiting the surface current density. On the other hand, such a process leads to a fritting temperature which cannot be below 1600° C. as stated in French Pat. No. 1,513,898 (page 2, column 1). Therefore, as a result of this temperature, it is not possible to use a metal such as nickel whose melting temperature is 1455° C.

BRIEF SUMMARY OF THE INVENTION

The present invention obviates these disadvantages. It relates to the process of a preparation of a ceramic member having inclusions of electrically conductive material flush with its surface. It is consequently unnecessary to use a porogenic material for producing triple points necessary, as stated hereinbefore, for the satisfactory operation of the cathode. Moreover, the member obtained according to the process of the invention has satisfactory properties with regard to stability and resistance to mechanical stresses, more particularly for a use as a cathode associated with a solid electrolyte in a high temperature steam electrolytic cell.

The invention therefore relates to a process for the production of a ceramic member having inclusions of electrically conductive material flush with its surface, wherein it comprises depositing on the bottom of a mould a small number of particles of said conductive material, placing above said particles the ceramic powder and compressing together the aggregate formed by the powder and the particles, followed by fritting at a temperature below the melting temperature of the conductive material.

Preferably, the conductive material used is formed by particles of nickel and the aggregate obtained by the simultaneous compression of these nickel particles and the ceramic powder is fritted at a temperature of 1300° C.

The above process takes advantage of the fact that by carrying out the first fritting of a blank of the member in which are distributed at the desired points electrically conductive material particles, it is simultaneously possible to obtain a satisfactory densification of the ceramic material and a stabilisation of the electrically conductive material particles which are thus firmly fixed to the ceramic material at the desired points.

The process according to the invention is particularly suitable for producing a cathode-solid electrolyte assembly for a high temperature steam electrolytic cell. By preparing the blank from a ceramic powder, able to form a solid electrolyte and by appropriately distributing in the surface layer of the blank, electrically made conductive material particles it is possible to obtain directly by fritting a solid electrolyte member having on its surface electrically conductive material particles interconnected so as to form a conductive cathode network.

According to a variant of the process of the invention which is particularly advantageous for producing a cathode-solid electrolyte assembly for a high temperature steam electrolytic cell, particles of the said material are distributed into the surface layer of the blank in such a quantity that, after fritting, a member is obtained having on its surface inclusions of the electrically conductive material interconnected so as to form on the surface of said member an electrically conductive network.

This variant of the process of the invention makes it possible to directly obtain a cathode-solid electrolyte assembly in which the cathode is formed during fritting by the joining of metallic particles which thus remain firmly fixed in the ceramic material constituting the solid electrolyte.

According to another embodiment of the process of the invention, after fritting the member obtained undergoes a complimentary treatment consisting of forming on said member in contact with said inclusions, a coating of an electrically conductive material in accordance with a given path.

This complimentary treatment is in particular carried out when the quantity of particles of electrically conductive material distributed on the surface of the member is not sufficient to form, during fritting, metal inclusions joined together in the form of a conductive network.

In this case, the metal inclusions constitute the fixing points of a thin flexible conductive deposit deposited on the member in accordance with a given line in order to form on the latter an electrically conductive cathode network firmly anchored in the surface layer of the member.

This complimentary treatment can for example be obtained by depositing on the entire surface of the member having the inclusions a thin layer of electrically conductive material and by then eliminating certain parts of the layer by photogravure.

According to a feature of the present process of the invention, the particles of electrically conductive material are in the form of balls or fine particles and their size is preferably between 3 and 30μ.

According to another feature of the process of the invention the powder of the ceramic material preferably has a particle size of about 0.02 μm, i.e. a specific surface at least equal to 50 m$^2$/g.

When the process of the invention is used for producing members which can be employed as a cathode associated with a solid electrolyte for a steam electrolytic cell, the ceramic material is an oxygen ion-conducting ceramic material, preferably constituted by an oxide or a mixture of ionic conductive oxides, such as a mixture of zirconium oxide and yttrium oxide.

In this case, the electrically conductive material is constituted by a metal, alloy or metallic compound momentarily able to fix hydrogen. As an example, said material may be constituted by nickel.

The invention will be better understood from reading the following non-limitative examples with reference to the drawing which is a microphotograph of a member obtained by the process of the invention.

EXAMPLE 1

This example relates to the preparation of 15 g yttriated zirconium disks having on one of their faces nickel inclusions and with a surface density of 10 mg/cm$^2$.

The starting material is a screened nickel powder in acetone between 10 and 30μ. About 0.6 g. of this nickel powder are dispersed and deposited by decanting on the surface of a steel disk 15 mm thick and with a diameter of 130 mm.

The steel disk is placed on the lower plunger of a press in such a way that the nickel-covered surface is a few millimeters below the surface of the table and above the nickel powder is placed 15 g of an yttriated zirconium powder (0.09 Y$_2$O$_3$–0.91 ZrO$_2$, molar concentration) having a specific surface of at least 50 m$^2$/g and screened to a particle aggregate size equal to or below 0.160 mm by carefully placing the zirconium powder on the initial nickel deposit.

By using a small rule, the zirconium powder is brought level and then the powder mixture is compressed at a pressure of 2 t/cm$^2$.

In this way, a compressed disk is obtained which forms the blank of the member, said disk having at one of its faces a surface layer in which are distributed the nickel particles.

This compressed disk is then placed on a flat alumina or molybdenum support by covering with a granulated powder or an interposed magnesia disk the disk face carrying the nickel particles.

In this way, it is possible to stack several disks, then placing a weight of about 500 g on the top of the stack to combat possible deformations during fritting. Fritting of the disks is then carried out by placing the stack of disks located on the flat support in a kiln in which circulates a gaseous hydrogen stream. The stack in the kiln is brought to a temperature of 100° C. by heating at a rate of 100° C./h, the temperature being maintained for about 8 hours.

In this way, fritted disks are obtained which can be used as a solid electrolyte associated with a nickel cathode in an electrolytic cell at high temperature.

By referring to the attached drawing, which is a microphotograph of a section of the thus obtained disk, it is possible to see that the grains of nickel are implanted on the surface of the member.

Measurement of the surface resistance of the disks shows that the face of the disks carrying the nickel inclusions is conductive. Moreover, due to the irregularity of the conductive network formed by the nickel inclusions, said disks have a large amount of contact points between the nickel and the ceramic material or a large number of triple points.

This number can be characterised by the gradient of the intensity-potential curve for i=0. To obtain this curve, the intensity which passes into the material as a function of the potential applied thereto is measured. In the vicinity of i=0, the gradient of the curve obtained gives an approximation of the number of triple points which rises with Δi for a given Δe. For partial pressures equal to water and hydrogen, the value related to 1cm$^2$ is below 100Ω.

EXAMPLE 2

This example relates to a preparation of 15 g yttriated zirconium disks having on one of their faces 5 mg/cm$^2$ of nickel inclusions.

For this preparation, the operating procedure of example 1 is followed, the only difference being that only 0.3 g of nickel powder are dispersed on the surface of the steel disk. The pressure conditions for the production of the blank and the fritting conditions are identical to those of example 1.

After fritting, it is found that the face of the disks carrying the nickel inclusions is not conductive, i.e. the inclusions are not interconnected from a conductive network.

In this case, a conductive network is formed by the subsequent vacuum deposition on the face of the fritted disk carrying the nickel inclusions of a nickel layer with a thickness of about 2μ. Certain parts of this layer are then removed in order to form a conductive network by using the photogravure process. Thus, on the nickel layer is formed a design in the form of a 10μ cycle grid, which is then developed by using ferric chloride.

The layer obtained remains connected to the nickel bridges implanted in the ceramic material. Due to its thinness, it is flexible and does not lead to unbearable mechanical stresses for the electrolyte disk during the thermal cycles occurring in use (0° to 850° C.).

It should be noted that in these two examples the nickel present on the surface of the member forms a porous structure.

What is claimed is:

1. A process for the production of a cathode-solid electrolyte assembly consisting of a ceramic member having only on its surface inclusions of electrically conductive nickel joined together so as to form on said surface an electrically conductive network, which comprises:

depositing on the bottom of a mold a first layer of particles of said conductive nickel, said particles having a size between 3 and 30μ, providing a surface density of said particles in the first layer of about 10 mg/cm$^2$ whereby they form after fritting an electrically conductive cathodic network, placing above said layer of particles a second layer of the ceramic powder, compressing together the two layers, and fritting said compressed layers at a temperature below the melting temperature of the conductive nickel.

2. A process for the production of a ceramic member according to claim 1, wherein the aggregate obtained by the compression of said nickel particles and the ceramic powder is fritted at a temperature of 1300° C.

3. A process according to claim 1 or claim 2, wherein the ceramic material is an oxygen ion-conducting ceramic material.

4. A process according to claim 3, wherein the ceramic material comprises a mixture of conductive ionic oxides.

5. A process according to claim 4, wherein the ceramic material is a mixture of zirconium oxide and yttrium oxide.

6. A process according to claim 1, wherein the powder of the ceramic material has a specific surface at least equal to 50 m$^2$/g.

7. A cathode-solid electrolyte assembly obtained by using the process according to claim 1.

8. A process for the production of a ceramic member having only on its surface inclusions of electrically conductive nickel joined together so as to form on said surface an electrically conductive network, which comprises:

depositing on the bottom of a mold a first layer of particles of said conductive nickel, said particles having a size between 3 and 30μ, placing above said layer of particles a second layer of the ceramic powder, compressing together the two layers, fritting said compressed layers at a temperature below the melting temperature of the conductive nickel, the surface density of said parties in the first layer being about 10 mg/cm$^2$ and depositing on the surface of said fritted member a complimentary coating of electrically conductive material having a predetermined path, said coating being in contact with said first layer.

9. A process according to claim 8, wherein the said coating with a predetermined path is formed by depositing on the entire surface of said member a layer of the material and by then removing parts of said coating by photogravure.

10. A process of the production of a ceramic member according to claim 8 or claim 9, wherein the aggregate obtained by the simultaneous compression of these nickel particles and the ceramic powder is fritted at a temperature of 1300° C.

11. A process according to claim 8, wherein the ceramic material is an oxygen ion-conducting ceramic material.

12. A process according to claim 11, wherein the ceramic material comprises a mixture of conductive ionic oxides.

13. A process according to claim 12, wherein the ceramic material is a mixture of zirconium oxide and yttrium oxide.

14. A process according to claim 8, wherein the powder of the ceramic material has a specific surface at least equal to 50 m$^2$/g.

15. A cathode-solid electrolyte assembly obtained by using the process according to claim 8.

* * * * *